United States Patent [19]
Ichinoi

[11] Patent Number: 4,772,961
[45] Date of Patent: Sep. 20, 1988

[54] VIDEO SIGNAL REPRODUCING APPARATUS

[75] Inventor: Yutaka Ichinoi, Yokohama, Japan

[73] Assignee: Victor Company of Japan, Ltd., Kanagawa, Japan

[21] Appl. No.: 814,222

[22] Filed: Dec. 27, 1985

[30] Foreign Application Priority Data

Dec. 28, 1984 [JP] Japan ................... 59-278686

[51] Int. Cl.⁴ ............................................. H04N 5/92
[52] U.S. Cl. ................... 360/9.1; 360/33.1; 358/138; 358/133; 358/335
[58] Field of Search ............... 360/9.1, 33.1, 22; 358/138, 133, 335

[56] References Cited

U.S. PATENT DOCUMENTS

| | | | |
|---|---|---|---|
| 3,679,823 | 7/1972 | Corrigan | 360/33.1 |
| 3,746,781 | 7/1973 | Nahayama | 360/22 |
| 4,197,562 | 4/1980 | Kikuya | 360/64.1 |
| 4,330,791 | 5/1982 | Ohara | 360/35.1 |
| 4,644,412 | 2/1987 | Nishimoto | 358/335 |
| 4,682,250 | 6/1987 | Hirota | 358/335 |

FOREIGN PATENT DOCUMENTS

| | | | |
|---|---|---|---|
| 2952627 | 7/1980 | Fed. Rep. of Germany | 360/84 |
| 77373 | 5/1983 | Japan | 358/133 |
| 1439802 | 6/1976 | United Kingdom | 360/33.1 |
| 1477067 | 6/1977 | United Kingdom | 360/33.1 |

OTHER PUBLICATIONS

"An Introduction to Analog Component Recording", by Sadashige, SMPTE Journal, May 1984, pp. 477–485.

Primary Examiner—Alan Faber
Attorney, Agent, or Firm—Michael N. Meller

[57] ABSTRACT

A video signal reproducing apparatus comprises a main head and an auxiliary head for simultaneously reproducing from a recording medium two video signals having a mutual time difference of approximately one field, and a circuit for performing a re-sampling and/or a conversion for displaying the reproduced video signal as a progressively scanned frame of picture based on the two reproduced video signals.

11 Claims, 11 Drawing Sheets

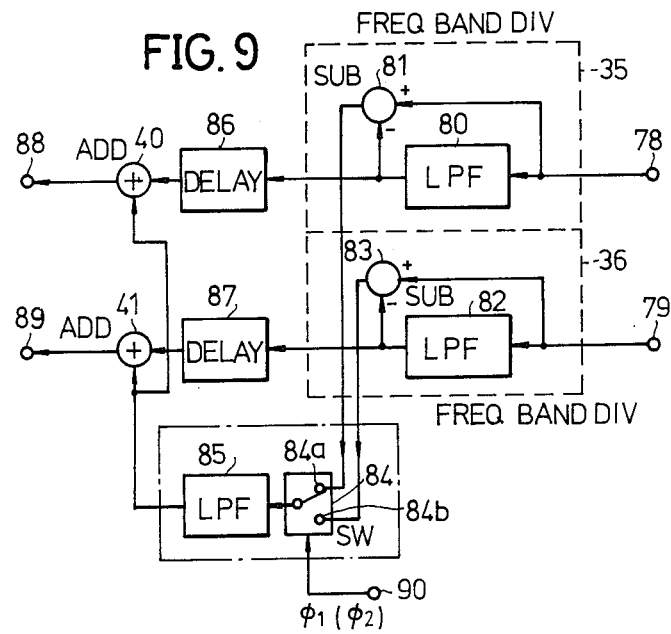
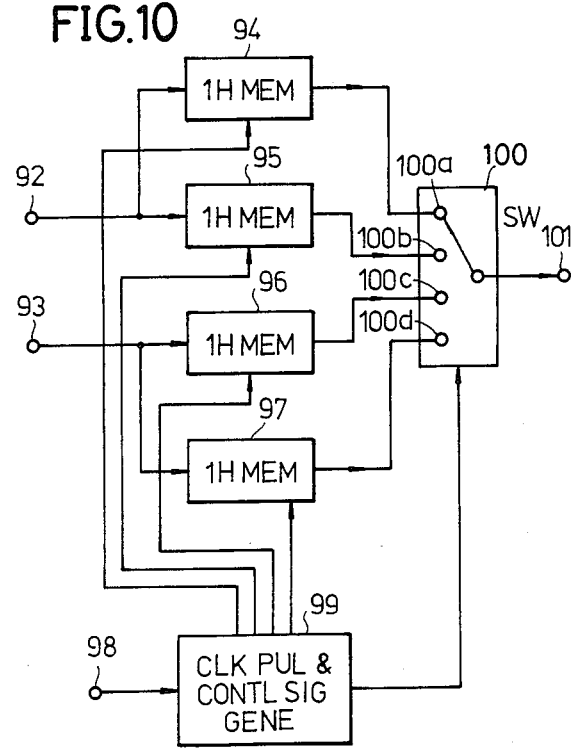

ns in between the reproduced first and second signal parts, which first signal

VIDEO SIGNAL REPRODUCING APPARATUS

BACKGROUND OF THE INVENTION

The present invention generally relates to video signal reproducing apparatuses, and more particularly to a video signal reproducing apparatus for producing a reproduced video signal from which a reproduced picture of a high quality can be obtained, by use of two reproduced video signals having a mutual time difference of approximately one field.

Generally, in a helical scan type magnetic recording and reproducing apparatus (hereinafter simply referred to as a video tape recorder or VTR), a video signal is recorded on a moving magnetic tape by one or a plurality of rotary magnetic heads and the recorded video signal is reproduced from the tape by the one or plurality of heads. An upper limit frequency of the video signal is 4.2 MHz, for example, and the frequency band of the video signal is wide. As is well known, in order to record the video signal having the wide frequency band on the tape by frequency-modulating the video signal, for example, and then reproduce the recorded signal from the tape, a relative speed between the head and the tape must be set to a high speed which is over a predetermined value. In addition, it is necessary to use a high performance head having a high sensitivity in a high frequency range.

However, in the case of the VTR for home use, the relative speed between the head and the tape is inevitably set to a speed which is considerably lower than the predetermined value because of the need to reduce the cost of the apparatus, downsize the apparatus, and reduce the weight of the apparatus. For this reason, the recording and reproducing frequency band becomes narrower than the original frequency band of the video signal, and it is impossible to produce a reproduced video signal from which a reproduced picture of a high quality can be obtained.

Accordingly, a video signal recording and reproducing apparatus was previously proposed in a U.S. patent application Ser. No. 620,016, now U.S. Pat. No. 4,682,250, entitled "VIDEO SIGNAL RECORDING AND REPRODUCING APPARATUS" filed June 13, 1984 in which the assignee is the same as the assignee of the present application. According to this previously proposed video signal recording and reproducing apparatus, a recording video signal is sampled at a frequency fs which is slightly higher than the frequency band of the recording video signal, and the sampled signal is recorded on a recording medium. The signal which is reproduced from the recording medium is delayed by one horizontal scanning period, and the delayed signal and an undelayed signal are alternately sampled with the frequency fs and mixed so as to obtain a reproduced video signal which has essentially been sampled at a frequency 2 fs which is twice the frequency fs. According to this previously proposed apparatus, it is possible to reproduce signal components in a relatively high frequency range, with a relatively narrow frequency band, and thus, it is possible to obtain a reproduced video signal having a wide frequency band. However, in a reproducing system of this previously proposed apparatus, a field memory is used to obtain two kinds of reproduced sampled signals having a mutual time difference of one field, and as a result, there are problems in that the apparatus becomes complex and expensive.

On the other hand, it is known from a Japanese Laid-Open Patent Application No. 58-77373, for example, that it is possible to obtain a flicker-free reproduced picture having a high picture quality by displaying a reproduced video signal as a progressively scanned frame of picture. According to this known reproducing apparatus, an input reproduced video signal is supplied to a first time base compression circuit and a field memory, and the first time base compression circuit supplies to a first terminal of a switching circuit a first time base compressed video signal which is obtained by time base compressing the input reproduced video signal by $\frac{1}{2}$. The input reproduced video signal is a video signal which is to be displayed with an interlaced scanning in conformance with an existing television system. The input reproduced video signal which is delayed by one field in the field memory is time base compressed by $\frac{1}{2}$ into a second time base compressed video signal in a second time base compression circuit. The second time base compressed video signal from the second time base compression circuit is supplied to a second terminal of the switching circuit. The switching circuit alternately passes the first and second time base compressed video signals respectively supplied to the first and second terminals thereof for every $\frac{1}{2}$ the horizontal scanning period, and supplies to a monitoring display apparatus a reproduced video signal in which the first and second time base compressed video signals are alternately transmitted in time sequence. The monitoring display apparatus displays the reproduced video signal as a progressively scanned frame of picture. Hence, although a flicker is generated in the reproduced picture when reproducing with the interlaced scanning a picture which includes a pattern such as horizontal lines since it is only possible to carry out the reproduction in terms of frames according to the interlaced scanning, it is possible to carry out the reproduction in terms of fields according to this conventional reproducing apparatus and hence obtain a flicker-free reproduced picture of a high quality. However, this conventional reproducing apparatus also uses a field memory and there are problems in that the apparatus becomes complex and expensive.

SUMMARY OF THE INVENTION

Accordingly, it is a general object of the present invention to provide a novel and useful video signal reproducing apparatus in which the problems described heretofore are eliminated.

Another and more specific object of the present invention is to provide a video signal reproducing apparatus for obtaining a reproduced video signal by reproducing from a recording medium a video signal which is subjected to a predetermined signal processing and is recorded on successive tracks on the recording medium in terms of fields of the video signal, where the tracks comprise first tracks recorded with a first signal part and second tracks recorded with a second signal part having a time difference of approximately one field with respect to the first signal part. The video signal reproducing apparatus according to the present invention comprises a main head for scanning the first tracks and for reproducing the first signal part, an auxiliary head for scanning the second tracks and for reproducing the second signal part, which main and auxiliary heads simultaneously and respectively scan one of the first tracks and one of the second tracks and simultaneously reproduce the first and second signal parts, a first signal processing circuit for subjecting the first signal part reproduced by the main head to a predetermined signal processing, a second signal processing circuit for subjecting the second signal part reproduced by the auxiliary head to a predetermined signal processing, a first time base compression circuit for time base compressing an output of the first signal processing circuit, a second time base compression circuit for time base compressing an output of the second signal processing circuit, and a switching circuit supplied with outputs of first and second time base compression circuits for producing the reproduced video signal by alternately passing these outputs responsive to a switching signal. According to the apparatus of the present invention, since the main and auxiliary heads simultaneously reproduce the signals parts which are recorded with a mutual time difference of approximately one field, it is possible to use the two reproduced signals from the main and auxiliary heads when the scanning line of one field is interpolated so that the reproduced video signal to be displayed as a progressively scanned frame of picture is obtainable without the use of a field memory. Further, with respect to a low frequency signal component having no folded-back alias component, it is possible to suppress the flicker without deteriorating the vertical resolution by performing the non-interlaced scanning alone.

Still another object of the present invention is to provide a video signal reproducing apparatus wherein the recording medium is recorded with a video signal which is sampled with a pulse which has a repetition frequency is described by fs $\simeq nf_H$ and has a phase which differs by 180° for every one field of an input video signal, where n is a natural number, $f_H$ represents a horizontal scanning frequency of the input video signal, and the frequency fs is less than two times an upper limit frequency of the input video signal and is higher than said upper limit frequency, and the video signal reproducing apparatus further comprises a reproduced video signal producing circuit supplied with the outputs of the first and second signal processing circuits for supplying these outputs to the respective first and second time base compression circuits after alternately re-sampling these outputs with a pulse having the repetition frequency fs and having a phase which differs by 180° for every one field. According to the apparatus of the present invention, the re-sampling is performed by alternately obtaining samples of the two kinds of reproduced sampled signals which are reproduced by the main and auxiliary heads and have the mutual time difference of approximately one field. As a result, although the transmission system has a narrow frequency band, it is possible to produce a reproduced video signal having a base band wider than the frequency band of the transmission system without the use of a field memory. On the other hand, with respect to a high frequency signal component including the folded-back alias component, it is possible to improve the horizontal resolution by combining the non-interlaced scanning with the frequency band compression which is obtained by the re-sampling, although the vertical resolution becomes slightly deteriorated. In addition, since the field memory is not used, the circuit construction is simple and it is possible to manufacture the apparatus at a low cost.

A further object of the present invention is to provide a video signal reproducing apparatus for obtaining a reproduced video signal by reproducing from a recording medium a video signal which is subjected to a predetermined signal processing and is recorded on successive tracks on the recording medium in terms of fields of the video signal, which recording medium is recorded with a video signal which is sampled with a pulse which has a repetition frequency fs described by fs $\simeq nf_H$ and has a phase which differs by 180° for every one field of an input video signal, where n is a natural number, $f_H$ represents a horizontal scanning frequency of the input video signal, and the frequency fs is less than two times an upper limit frequency of the input video signal and is higher than said upper limit frequency, and the tracks comprise first tracks recorded with a first signal part and second tracks recorded with a second signal part having a time difference of approximately one field with respect to the first signal part. The video signal reproducing apparatus according to the present invention comprises a main head for scanning the first tracks and for reproducing the first signal part, an auxiliary head for scanning the second tracks and for reproducing the second signal part, which main and auxiliary heads simultaneously and respectively scan one of the first tracks and one of the second tracks and simultaneously reproduce the first and second signal parts, a first signal processing circuit for subjecting the first signal part reproduced by the main head to a predetermined signal processing, a second signal processing circuit for subjecting the second signal part reproduced by the auxiliary head to a predetermined signal processing, a reproduced video signal producing circuit supplied with the outputs of the first and second signal processing circuits for alternately re-sampling these outputs with a pulse having the repetition frequency fs and having a phase which differs by 180° for every one field, and an adding circuit for adding re-sampled signals from the reproduced video signal producing circuit to obtain the reproduced video signal which is to be displayed in an interlaced scanning. According to the apparatus of the present invention, the re-sampling is performed by alternately obtaining samples of the two kinds of reproduced sampled signals which are reproduced by the main and auxiliary heads and have the mutual time difference of approximately one field. As a result, although the transmission system has a narrow frequency band, it is possible to produce a reproduced video signal having a base band wider than the frequency band of the transmission system without the use of a field memory.

Other objects and further features of the present invention will be apparent from the following detailed description when read in conjunction with the accompanying drawings.

BRIEF DESCRIPTION OF THE DRAWINGS

FIG. 9 is a system block diagram showing an embodiment of an essential part of a reproducing system within the block system shown in FIG. 1;

FIG. 10 is a system block diagram showing an embodiment of a time base compression circuit and the like within the block system shown in FIG. 1;

DETAILED DESCRIPTION

Figure 1:
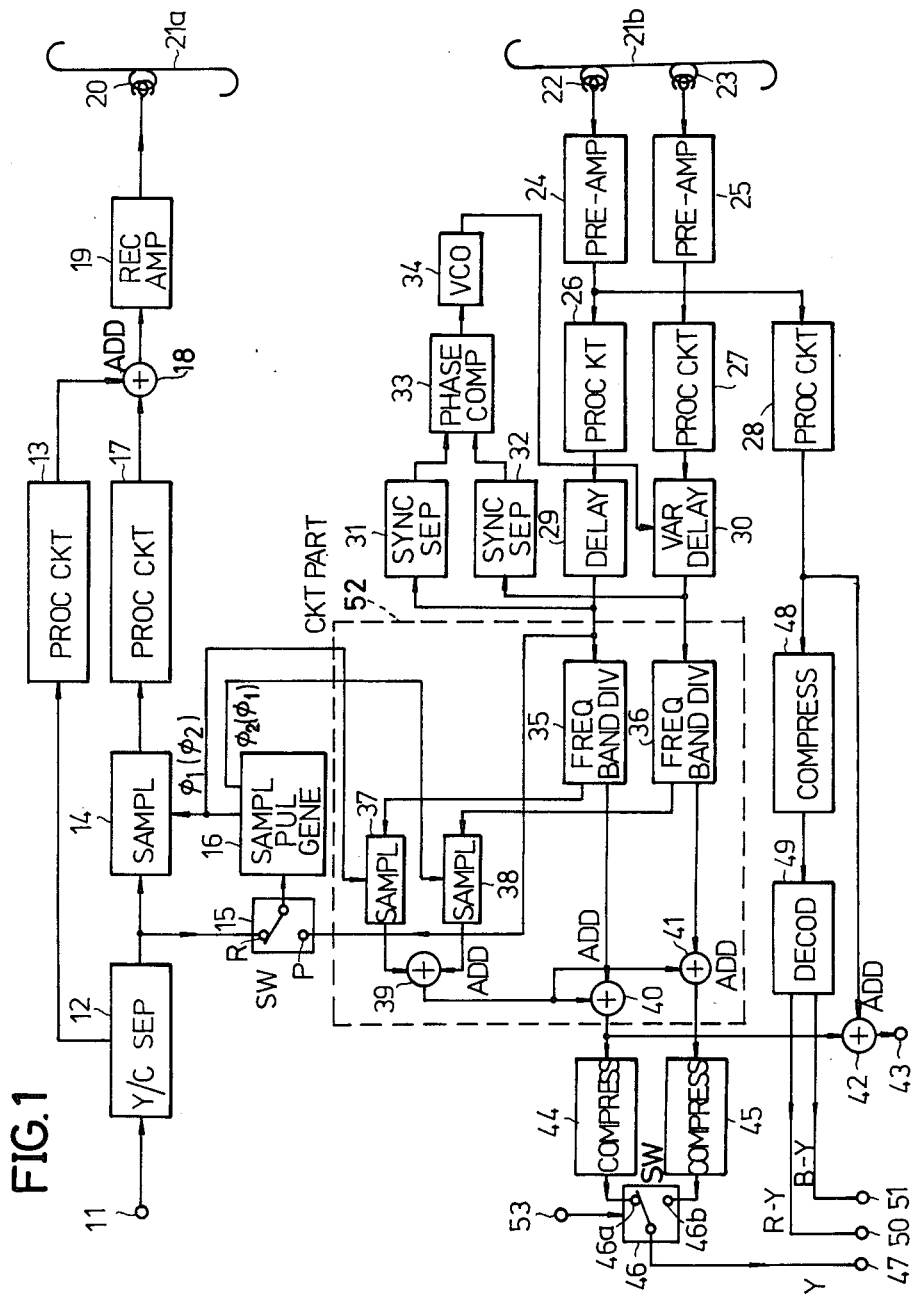
FIG. 1 is a system block diagram showing a first embodiment of the video signal reproducing apparatus according to the present invention.

FIG. 1 shows a first embodiment of the video signal reproducing apparatus according to the present invention. In the embodiment shown in FIG. 1, the present invention is applied to a VTR having a recording system and a reproducing system. However, it is of course possible to apply the present invention to other video signal reproducing apparatuses such as a video disc player and a VTR only having a reproducing system.

First, description will be given with respect to the operation of the apparatus at the time of a recording. A composite color video signal applied to an input terminal 11 is supplied to a luminance/chrominance signal separating circuit (Y/C separating circuit) 12 wherein a luminance signal and a carrier chrominance signal are respectively separated from the composite color video signal. The carrier chrominance signal is supplied to a recording signal processing circuit 13 wherein the carrier chrominance signal is frequency-converted into a low frequency range as in the case of the conventional apparatus employing the known system of frequency-converting the carrier chrominance signal into a low frequency range. On the other hand, the luminance signal is supplied to a sampler 14, and is also supplied to a sampling pulse generating circuit 16 through a switching circuit 15 which is connected to a terminal R in the recording mode.

Figure 2:
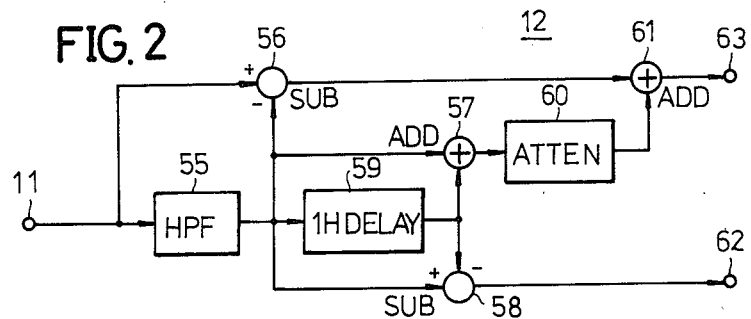
FIG. 2 is a system block diagram showing an embodiment of a luminance/chrominance signal separating circuit within the block system shown in FIG. 1.

FIG. 2 shows an embodiment of the Y/C separating circuit 12. The composite video signal from the input terminal 11 is passed through a highpass filter 55 having a cutoff frequency in the order of 3 MHz and is supplied to a subtracting circuit 56. The composite video signal from the input terminal 11 is also supplied directly to the subtracting circuit 56. Hence, a low frequency component of the luminance signal under 3 MHz is obtained from the subtracting circuit 56 and is supplied to an adding circuit 61. A high frequency component of the luminance signal over 3 MHz and the carrier chrominance signal are band share multiplexed in the signal which is obtained from the highpass filter 55. The high frequency component of the luminance signal is separated and filtered from the output signal of the highpass filter 55 in a first comb filter which is constituted by an adding circuit 57 and a 1 H delay circuit 59, and the high frequency component of the luminance signal is supplied to an attenuator 60, where H represents one horizontal scanning period. The carrier chrominance signal is separated and filtered from the output signal of the highpass filter 55 in a second comb filter which is constituted by a subtracting circuit 58 and the 1H delay circuit 59, and the carrier chrominance signal is supplied to an output terminal 62. The amplitude of the high frequency component of the luminance signal is attenuated by $\frac{1}{2}$ in the attenuator 60 and the attenuated signal component is supplied to the adding circuit 61. As a result, the luminance signal within the input composite color video signal is produced from the adding circuit 61 and is obtained through an output terminal 63.

Figure 3:
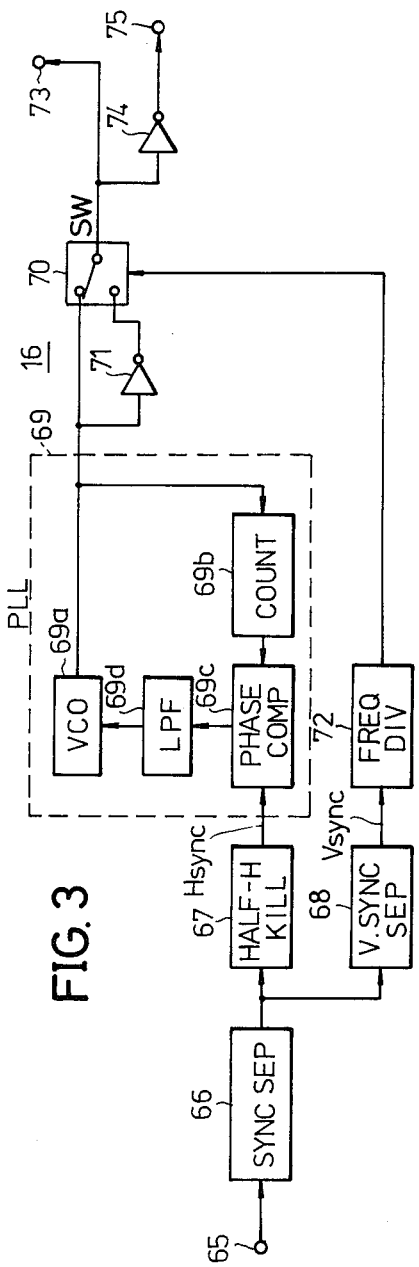
FIG. 3 is a system block diagram showing an embodiment of a sampling pulse generating circuit within the block system shown in FIG. 1.

FIG. 3 shows an embodiment of the sampling pulse generating circuit 16. The luminance signal from the switching circuit 15 is applied to a terminal 65 and is supplied to a synchronizing signal separating circuit 66. An output composite synchronizing signal of the synchronizing signal separating circuit 66 is supplied to a half-H killer circuit 67 and a vertical synchronizing signal separating circuit 68. A horizontal synchronizing signal from the half-H killer circuit 67 is supplied to a phase comparator 69c within a phase locked loop (PLL) circuit 69. The PLL circuit 69 comprises a voltage controlled oscillator (VCO) 69a, a counter 69b for counting an output of the VCO 69a, the phase comparator 69c for comparing phases of the outputs of the counter 69b and the half-H killer circuit 67, and a lowpass filter 69d for filtering an output of the phase comparator 69c and for supplying an output to the VCO 69a. An output of the PLL circuit 69, that is, the output of the VCO 69a, is supplied to a first terminal of a switching circuit 70. On the other hand, the output of the PLL circuit 69 is supplied to a second terminal of the switching circuit 70 through an inverter 71.

The vertical synchronizing signal from the vertical synchronizing signal separating circuit 68 is passed through a $\frac{1}{2}$ frequency divider 72 and is supplied to the switching circuit 70 as a switching signal. As a result, two kinds of pulses respectively having a predetermined repetition frequency fs but having phase which mutually differ by 180° are alternately obtained from the switching circuit 70 for every one field. The output pulse of the switching circuit 70 is supplied directly to a terminal 73, and is also supplied to a terminal 75 through an inverter 74. Two kinds of sampling pulses $\phi 1$ and $\phi 2$ respectively having the predetermined repetition frequency fs but having phases which mutually differ by 180° are obtained from the terminals 73 and 75, one of these sampling pulses $\phi 1$ and $\phi 2$ is supplied to the sampler 14. The predetermined repetition frequency fs is less than two times an upper limit frequency fb of a required frequency band of the luminance signal and is a natural number multiple of a horizontal scanning frequency $f_H$. For example, the predetermined repetition frequency fs is approximately equal to 6 MHz.

Figure 4:
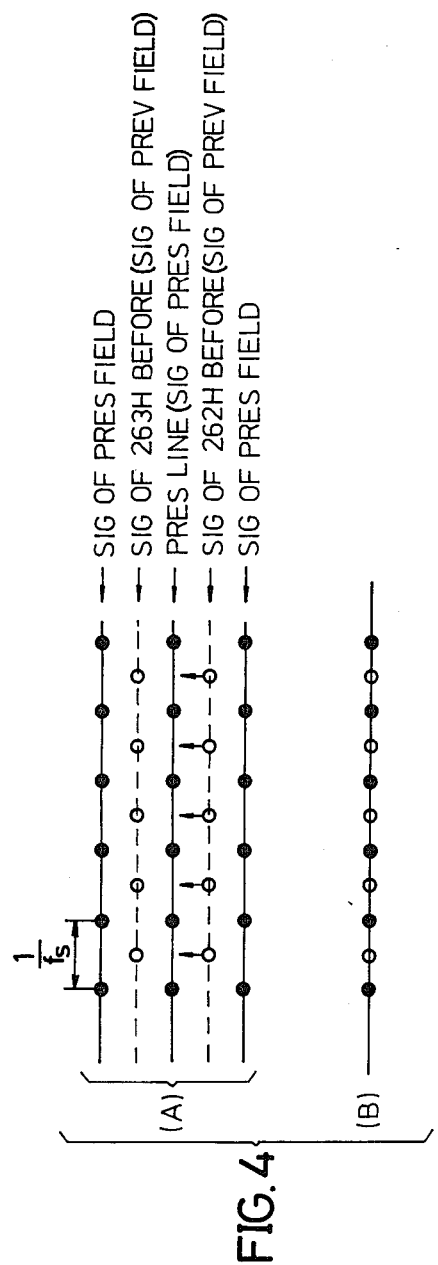
FIGS. 4(A) and 4(B) are diagrams for explaining sampling and re-sampling operations in the present invention.

The sampler 14 comprises a sample and hold circuit which samples the input luminance signal in a time period corresponding to the pulse width of the sampling pulse $\phi_1$ or $\phi_2$ having the narrow pulse width and holds the sampled signal until a time when the next sampling pulse $\phi_1$ or $\phi_2$ is obtained. Thus, the sampler 14 supplies to a recording signal processing circuit 17 the sampled signal which is obtained by sampling the input luminance signal by the sampling pulse $\phi_1$ or $\phi_2$. Because the phase of the sampling pulse $\phi_1$ or $\phi_2$ differs by 180° for every one field, samples of the sampled signal are arranged as shown in FIG. 4(A). In FIG. 4(A), black circular marks indicated positions of the samples in scanning lines of a present field, where the scanning lines of the present field are indicated by solid lines, and non-black circular marks indicated positions of the samples in scanning lines of a previous field, where the scanning lines of the previous field are indicated by phantom lines. As may be seen from FIG. 4(A), the samples in the scanning lines of the present field are aligned along the vertical direction, and the samples in the scanning lines of the previous field are also aligned along the vertical direction. Further, the samples in the scanning lines of the previous field are respectively deviated in the horizontal direction by approximately 1/(2 fs) with respect to the samples in the scanning lines of the present field. Accordingly, as will be described later on in the specification, it is possible to obtain a re-sampled (sub-sampled) signal in which the samples in an arbitrary scanning line of the present field are as shown in FIG. 4(B) by adding the samples of the present and previous fields in the reproducing system. The re-sampled signal is substantially equivalent to a signal which has been sampled with a frequency which is two times the predetermined repetition frequency fs. Therefore, even in a transmission system which has a narrow frequency band and can originally transmit only a luminance signal having an upper limit frequency up to 3.5 MHz, it becomes possible to substantially transmit a luminance signal having a wide frequency band with an upper limit frequency of 5 MHz, for example.

Figure 5:
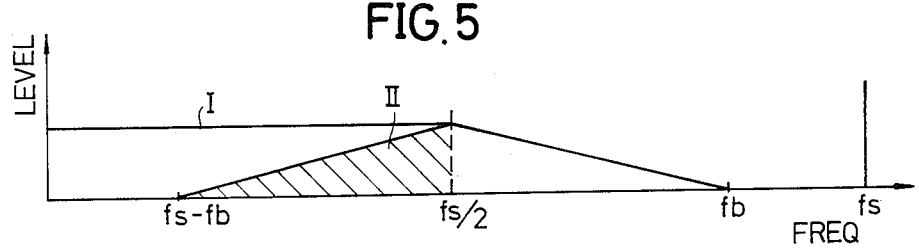
FIG. 5 is a diagram for explaining that a folded-back alias component mixes into a frequency band of a luminance signal.

The predetermined repetition frequency (sampling frequency) fs satisfies a relation $fb \leq fs < 2\ fb$ with respect to the upper limit frequency fb of the luminance signal having the frequency band I shown in FIG. 5. Hence, a folded-back alias component mixes into a frequency band of the luminance signal from a frequency $fs - fb$ to a frequency $fs/2$ as indicated by hatchings II in FIG. 5.

Figure 6:
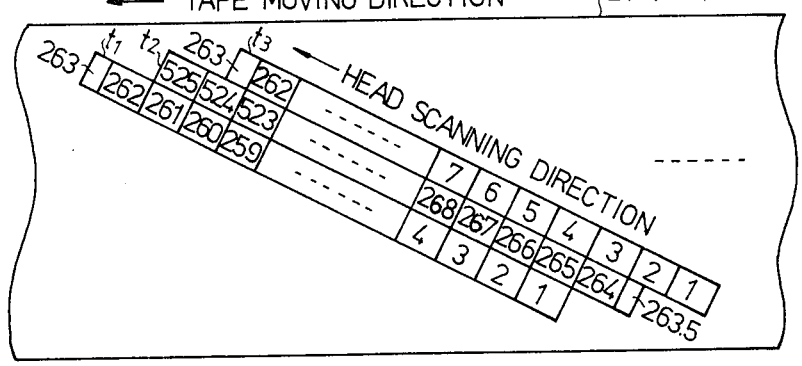
FIG. 6 shows a track pattern on a magnetic tape which is to be played.

Returning now to the description of FIG. 1, the recording signal processing circuit 17 carries out a signal processing including a pre-emphasis and a frequency modulation with respect to the sampled signal from the sampler 14 similarly as in the case of a signal processing performed with respect to the luminance signal in a recording system of the conventional VTR. An output frequency modulated (FM) signal of the recording signal processing circuit 17 is supplied to an adding circuit 18. A signal in which the FM signal from the recording signal processing circuit 17 and the frequency converted carrier chrominance signal from the recording signal processing circuit 13 are frequency division multiplexed is obtained from the adding circuit 18 and is supplied to a rotary magnetic head 20 through a recording amplifier 19. The head 20 records the signal from the recording amplifier 19 on successive tracks t1, t2, t3, ... of a magnetic tape 21a as shown in FIG. 6. In FIG. 6, numbers indicated in each of the tracks t1, t2, and t3 indicate the scanning line numbers of the composite color video signal of the system employing 525 scanning lines. The video signal is recorded on the successive tracks t1, t2, t3, ... in terms of one field.

Figure 7:
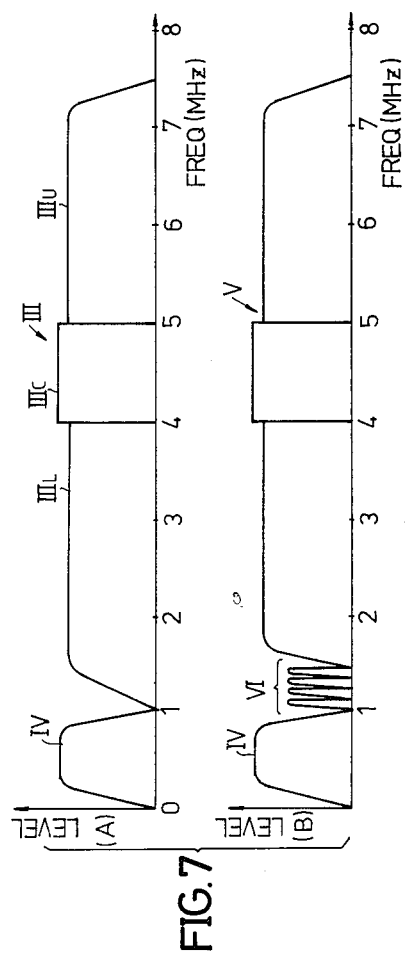
FIGS. 7(A) and 7(B) respectively show frequency spectrums of a recording signal.

FIG. 7(A) shows a frequency spectrum of a recording signal which is supplied to the head 20 when an audio signal is not recorded on video tracks. An FM signal from the recording signal processing circuit 17 has a frequency spectrum III including a carrier deviation bandwidth $III_C$, and upper side band $III_U$, and a lower side band $III_L$. The frequency converted carrier chrominance signal has a frequency spectrum IV.

On the other hand, FIG. 7(B) shows a frequency spectrum of the recording signal which is supplied to the head 20 when the audio signal is recorded on the video tracks. In FIG. 7(B), the FM signal has a frequency spectrum V which is narrower than the frequency spectrum III shown in FIG. 7(A) by a frequency band required to record the audio signal. In FIG. 7(B), frequency bands of four kinds of FM audio signals which are obtained by independently frequency-modulating four kinds of mutually different carriers by right and left channel stereo audio signals which are to be recorded by a pair of rotary magnetic heads, are indicated by VI. In this case, two pairs of FM audio signals are alternately switched for every one track and successively recorded on the video tracks by being frequency division multiplexed with the video signal. It is possible to record the audio signals on the video tracks by a known recording method, that is, by recording the audio signals on a deep part of a magnetic layer of the magnetic tape by use of heads which are used exclusively for the audio signals and have azimuth angles different from those of the video heads.

Figure 8B:
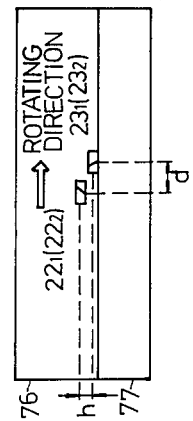
FIGS. 8A and 8B are a plan view and a side view respectively showing mounting positions of a main head and an auxiliary head on a rotary drum.
Figure 8A:
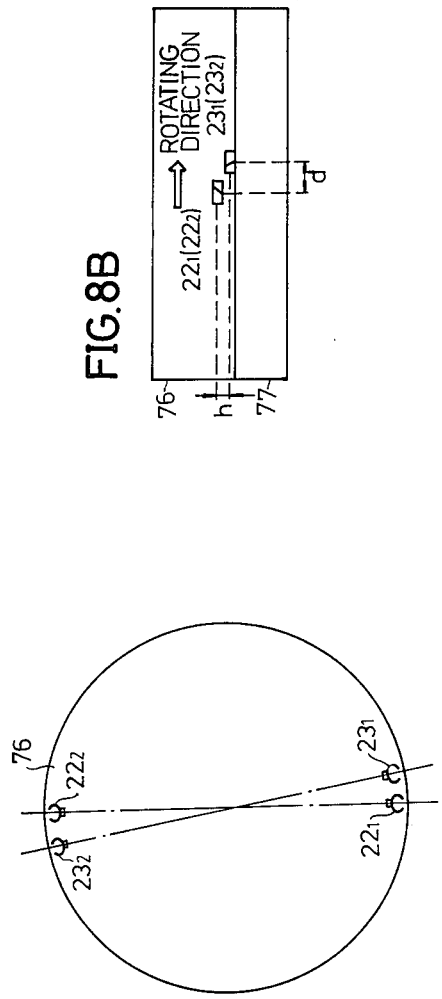

Next, description will be given with respect to a reproducing system. In FIG. 1, a magnetic tape 21b is recorded with the same signals as the magnetic tape 21a. A main head 22 and an auxiliary head 23 simultaneously reproduce signals parts on the tape 21b having a mutual time difference of approximately one field. As shown in FIG. 8A, the main head 22 comprises a first main head $22_1$ having an azimuth angle $\theta_1$ and a second main head $22_2$ having an azimuth angle $\theta_2$ which is different from the azimuth angle $\theta_1$, and the first and second main heads $22_1$ and $22_2$ are mounted diametrically on a rotary drum 76. Similarly, the auxiliary head 23 comprises a first auxiliary head $23_1$ having the azimuth angle $\theta_2$ and a second auxiliary head $23_2$ having the azimuth angle $\theta_1$, and the first and second auxiliary heads $23_1$ and $23_2$ are mounted diametrically on the rotary drum 76. For example, the first and second main heads $22_1$ and $22_2$ are used as the head 20 described before. As shown in FIGS. 8A and 8B, the main head $22_1$ ($22_2$) is mounted on the rotary drum 76 at a position lagging the auxiliary head $23_1$ ($23_2$) by a distance d in a rotating direction of the rotary drum 76.

When playing the tape 21b having the tape pattern shown in FIG. 6, the distance d is selected to a length corresponding to a recording wavelength of 2 H on the tape 21b, where H represents one horizontal scanning period. As shown in FIG. 8B, a relative height difference h exists between main head $22_1$ ($22_2$) and the auxiliary head $23_1$ ($23_2$) mounted on the rotary drum 76 which is disposed on a stationary drum 77. The main head $22_1$ ($22_2$) is arranged at a position higher than that of the auxiliary head $23_1$ ($23_2$) by a distance corresponding to one track pitch so that when the main head $22_1$ ($22_2$) scans over a certain track the auxiliary head $23_1$ ($23_2$) scans over an adjacent track which has been recorded one field before the certain track. The tape 21b is wrapped spirally around the outer peripheral surfaces of the drums 76 and 77 over an angular range which is slightly larger than 180°. The main head $22_1$ ($22_2$) reproduces from the tape 21b a first video signal part which is a reproduced field of the present, and at the same time, the auxiliary head $23_1$ ($23_2$) reproduces from the tape 21b a second video signal part which is a reproduced field of 262 H before, that is, approximately one field before. Even in the case where the distance d is deviated from a length corresponding to the recording wavelength of 2 H on the tape 21b, it is possible to simultaneously obtain the signal of the present field and the signal of 262 H before by use of a timing circuit which will be described later.

Returning now to the description of FIG. 1, the reproduced signals from the main head 22 ($22_1$, $22_2$) and the auxiliary head 23 ($23_1$, $23_2$) having a mutual time difference of approximately one field are passed through respective pre-amplifiers 24 and 25 and are supplied to respective reproduced signal processing circuits 26 and 27. The reproduced signals supplied to the reproduced signal processing circuits 26 and 27 are subjected to a signal processing similar to that performed in a luminance signal processing system of the existing VTR, that is, to a signal processing such as frequency demodulation and de-emphasis. A reproduced sampled signal (reproduced luminance signal) from the reproduced signal processing circuit 26 is passed through a delay line 29 and a synchronizing signal separating circuit 31. A reproduced sampled signal (reproduced luminance signal) from the reproduced signal processing circuit 27 is passed through a variable delay line 30 and a synchronizing signal separating circuit 32. Output reproduced horizontal synchronizing signals of the synchronizing signal separating circuits 31 and 32 are supplied to a phase comparator 33, and the phase comparator 33 supplies to a voltage controlled oscillator (VCO) 34 an error voltage in accordance with a phase difference between the two reproduced horizontal synchronizing signals so as to variably control an oscillation frequency of the VCO 34. The output of the VCO 34 is supplied to the variable delay line 30 which comprises a charge coupled device (CCD) and the like as a clock pulse for controlling the delay time of the variable delay line 30. The delay line 29, the variable delay line 30, the synchronizing signal separating circuits 31 and 32, the phase comparator 33, and the VCO 34 constitute a timing circuit. By the provision of the delay line 29 and the variable delay line 30, it is possible to eliminate a time base fluctuation between the reproduced signals from the main head 22 and the auxiliary head 23 caused by a jitter of the VTR, and in addition, it is possible to obtain such reproduced sampled signals (reproduced luminance signals) that the phases of the horizontal synchronizing signals of the two reproduced sampled signals coincide with each other. In a VTR in which the jitter is sufficiently small and negligible, it is possible to omit the timing circuit.

A first reproduced sampled signal (reproduced luminance signal) obtained from the delay line 29 is supplied to a frequency hand dividing circuit 35 on one hand, and is also supplied to the sampling pulse generating circuit 16 through the switching circuit 15 which is connected to a terminal P in the reproducing mode. At the same time, a second reproduced sampled signal (reproduced luminance signal) which is 262 H before the present field is obtained from the variable delay line 30 and is supplied to a frequency band dividing circuit 36. The frequency hand dividing circuits 35 and 36 respectively divide the frequency bands of the respective first and second reproduced sampled signals (reproduced luminance signals) into two about a frequency fa which is described by the following.

$$fa \approx (fs/2) - [fb - (fs/2)] = fs - fb$$

The frequency band dividing circuits 35 and 36 are provided for the following reasons. As described before in conjunction with FIG. 5, a folded-back alias component and a non-folded-back component coexist within the high frequency band of the reproduced sampled signal (reproduced luminance signal) from the frequency fs − fb ($\approx$ fa) to the frequency fs/2, and the folded-back alias component must be returned back into the original frequency band by re-sampling in samplers 37 and 38 which will be described later. On the other hand, with respect to the low frequency signal component which is under the frequency fa and does not include the folded-back alias component, it is necessary to prevent deterioration in the vertical resolution due to the re-sampling. When the frequency fs is approximately equal to 6 MHz and the frequency fb is approximately equal to 5 MHz, the frequency fa is approximately equal to 1 MHz.

High frequency signal components within the first and second reproduced sampled signals (reproduced luminance signals) which are subjected to the frequency band division in the frequency band dividing circuits 35 and 36 and over the frequency fa are supplied to the respective samplers 37 and 38 having the same construction as the sampler 14 described before. The samplers 37 and 38 re-sample parts of the signals which have been sampled at the time of the recording by the sampling pulses $\phi 1$ and $\phi 2$ from the sampling pulse generating circuit 16. First and second re-sampled signals which are obtained from the samplers 37 and 38 and have a mutual time difference of 262 H are supplied to an adding circuit 39. Accordingly, as described before in conjunction with FIGS. 4(A) and 4(B), the samples in the present line are interpolated with the samples of the line which is 262H before, and a re-sampled signal which is substantially equivalent to a signal which has been sampled with the frequency 2 fs is obtained. Moreover, the spectrum which is folded back is restored back into the original frequency band.

The re-sampled signal (high frequency signal component) obtained from the adding circuit 39 is supplied to adding circuits 40 and 41. The adding circuit 40 adds the re-sampled signal and the low frequency signal component which is within the first reproduced sampled signal (reproduced luminance signal) from the frequency band dividing circuit 35 and is under the frequency fa. The adding circuit 41 adds the re-sampled signal and the low frequency signal component which is within the second reproduced sampled signal (reproduced luminance signal) from the frequency band dividing circuit 36 and is under the frequency fa. A first reproduced luminance signal from the adding circuit 40, which is obtained from the signal of the present field reproduced by the main head 22, is supplied to an adding circuit 42 and is added with an output reproduced carrier chrominance signal of a reproduced signal processing circuit 28. The reproduced signal processing circuit 28 obtains the reproduced carrier chrominance signal by subjecting the frequency converted carrier chrominance signal within the reproduced signal from the pre-amplifier 24 to a signal processing which is similar to that performed in a carrier chrominance signal processing system of the existing VTR. As a result, although the luminance signal transmission system only has a transmission frequency band with an upper limit frequency of 3 MHz, it is possible to obtain from the adding circuit 42 through an output terminal 43 a composite color video signal wherein the luminance signal has a frequency band with an upper limit frequency of 5 MHz without the use of a field memory.

FIG. 9 shows a more detailed block system of a circuit part 52 indicated by a phantom line in FIG. 1. In FIG. 9, those parts which are the same as those corresponding parts in FIG. 1 are designated by the same reference numerals. In FIG. 9, the reproduced sampled signals from the delay line 29 and the variable delay line 30 are respectively applied to input terminals 78 and 79 and are supplied to the respective frequency band dividing circuits 35 and 36. The frequency band dividing circuit 35 comprises a lowpass filter 80 and a subtracting circuit 81. A low frequency signal component from the lowpass filter 80 is passed through a delay circuit 86 for adjusting the timing and is supplied to the adding circuit 40. A high frequency signal component fromt he subtracting circuit 81 is supplied to a terminal 84a of a switching circuit 84. The frequency band dividing circuit 36 comprises a lowpass filter 82 and a subtracting circuit 83. A low frequency signal component from the lowpass filter 82 is passed through a delay circuit 87 for adjusting the timing and is supplied to the adding circuit 41. A high frequency signal component from the subtracting circuit 83 is supplied to a terminal 84b of the switching circuit 84.

The switching of the switching circuit 84 is controlled by the sampling pulses $\phi_1$ and $\phi_2$ which are alternately applied to an input terminal 90 for every one field, and the high frequency signal components supplied to the terminals 84a and 84b are alternately and selectively passed through the switching circuit 84 every time the sampling pulse $\phi_1$ ($\phi_2$) is obtained from the input terminal 90. An output signal of the switching circuit 84 is passed through a lowpass filter 85 for eliminating the switching noise and is supplied to the adding circuits 40 and 41 as the re-sampled signal. Accordingly, a circuit part indicated by a one-dot chain line in FIG. 9 and comprising the switching circuit 84 and the lowpass filter 85 constitutes a re-sampling circuit which is made up of the samplers 37 and 38 and the adding circuit 39 described before. Delay circuits 86 and 87 are provided for adjusting the timing with respect to a delay quantity of the lowpass filter 85. The first and second reproduced luminance signals obtained from the adding circuits 40 and 41 are respectively supplied to output terminals 88 and 89.

The first and second reproduced luminance signals which are subjected to the re-sampling are thereafter subjected to a signal processing which will be described next, so that it is possible to display the reproduced video signal as a progressively scanned frame of picture wherein the horizontal scanning frequency is two times the horizontal scanning frequency $f_H$ of the standard television system. In other words, the first reproduced luminance signal is supplied to a time base compression circuit 44 shown in FIG. 1 wherein the time base is compressed by ½ and a first time base compressed luminance signal (hereinafter simply referred to as first compressed luminance signal) is supplied to a terminal 46a of a switching circuit 46. The second reproduced luminance signal is supplied to a time base compression circuit 45 wherein the time base is compressed by ½ and a time base compressed luminance signal (hereinafter simply referred to as a second compressed luminance signal) is supplied to a terminal 46b of the switching circuit 46. When it is assumed that a write-in clock pulse used for writing a datum into a CCD or a random access memory (RAM) has a frequency F, it is known that the time base can be compressed by ½ by using a read-out clock pulse having a frequency 2 F when reading out the stored data. The switching circuit 46 alternately passes the first and second compressed luminance signals supplied to the terminals 46a and 46b for every time period of H/2, responsive to a symmetrical square wave which has a repetition frequency $f_H$ and is supplied to the switching circuit 46 through a terminal 53. The output signal of the switching circuit 46 is supplied to an output terminal 47 as a reproduced luminance signal to be suitably displayed as a progressively scanned frame of picture and having a horizontal scanning frequency which is two times the horizontal scanning frequency $f_H$ of the standard television system.

Figure 11:
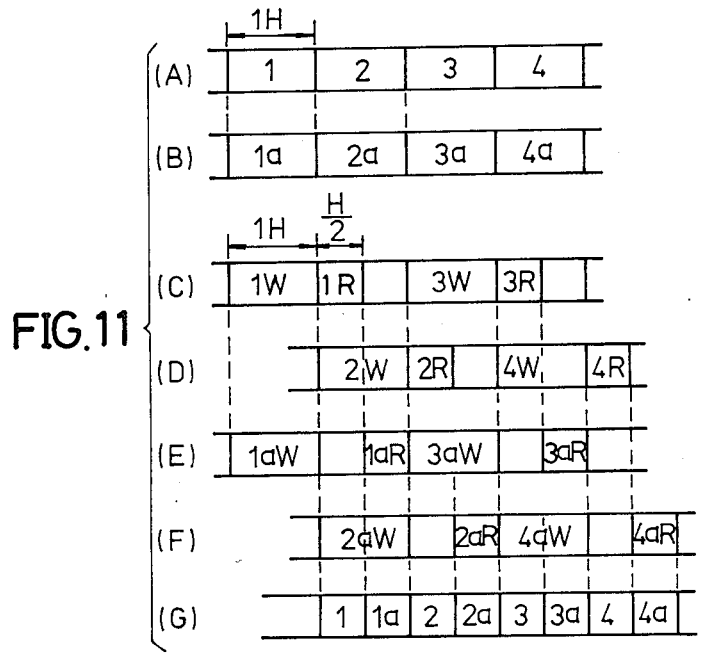
FIGS. 11(A) through 11(G) are diagrams for explaining the operation of the block system shown in FIG. 10.

FIG. 10 shows a more detailed block system of a circuit part made up of the time base compression circuits 44 and 45 and the switching circuit 46. In FIG. 10, the first reproduced luminance signal applied to an input terminal 92 is supplied to 1 H memories 94 and 95, and the second reproduced luminance signal applied to an input terminal 93 is supplied to 1 H memories 96 and 97. When it is assumed that the distance d between the main head 22 and the auxiliary head 23 is set to 2 H as described before, the first and second reproduced luminance signals are respectively arranged as shown schematically in FIGS. 11(A) and 11(B) with respect to time and the phase of the horizontal synchronizing signals of the two reproduced luminance signals coincide with each other. In FIGS. 11(A) and 11(B), numbers represent signals in each horizontal scanning period, and signals in each horizontal scanning period of the second reproduced luminance signal are designated by the numbers with a subscript "a". A clock pulse and control signal generating circuit 99 generates a write-in clock pulse having the frequency F and a read-out clock pulse having the frequency 2 F based on a reproduced horizontal synchronizing signal obtained through an input terminal 98. The memories 94 and 96 simultaneously perform a write-in operation for a time period of 1 H responsive to the write-in clock pulse from the generating circuit 99. During an immediately subsequent time period of 1 H, the memories 95 and 97 simultaneously perform a write-in operation responsive to the write-in clock pulse, and in addition, the memories 94 and 96 perform a read-out operation during a first half of this time period of 1 H (that is, during a time period of H/2) responsive to the read-out clock pulse from the generating circuit 99. Similarly, during a next time period of 1 H, the memories 94 and 96 simultaneously perform a write-in operation responsive to the write-in clock pulse, and in addition, the memories 95 and 97 perform a read-out operation during a first half of this time period of 1 H (that is, during a time period of H/2) responsive to the read-out clock pulse. These operations are repeated.

Accordingly, the memories 94 and 97 respectively perform operations shown schematically in FIGS. 11(C) through 11(F). In FIGS. 11(C) through 11(F), "W" indicates a write-in operation, "R" indicates a read-out operation, and the numbers indicate the signals in each of the horizontal scanning periods shown in FIGS. 11(A) and 11(B). The reproduced luminance signals which are time base compressed by ½ and read out from the memories 94 through 97 are supplied to terminals 100a through 100d of a switching circuit 100. The switching circuit 100 is successively switched for every time period of H/2 responsive to a control signal which is obtained from the generating circuit 99 so as to selectively supply to an output terminal 101 the output signal of one memory which is performing a read-out operation out of the memories 94 through 97. As a result, the reproduced luminance signal to be displayed as a progressively scanned frame of picture and having the horizontal scanning frequency which is two times that of the standard television system as shown schematically in FIG. 11(G) is obtained through the output terminal 101 (corresponding to the output terminal 47 shown in FIG. 1).

Figure 12:
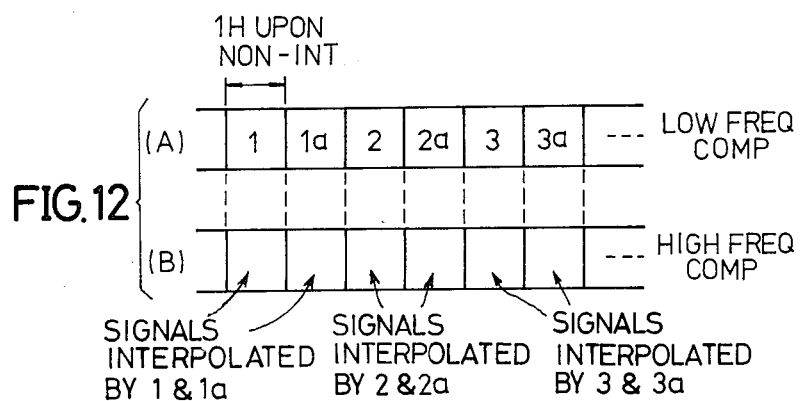
FIGS. 12(A) and 12(B) schematically show information contents of a low frequency signal component to be suitably displayed as a progressively scanned frame of picture and a high frequency signal component.

With respect to the low frequency signal component within the reproduced luminance signal obtained from the output terminal 47 (101) and under the frequency fa, the scanning line of the present field is interpolated with the scanning line of the previous field as shown schematically in FIG. 12(A) so as to obtain a signal to be displayed as a progressively scanned frame of picture. On the other hand, with respect to the high frequency signal component within the reproduced luminance signal obtained from the output terminal 47 (101) and over the frequency fa, the interpolation of the samples by the dot interleaving shown in FIG. 4(B) is performed between the present field and the previous field. Hence, when the high frequency signal component within the reproduced luminance signal is formed into a signal to be suitably for the displayed as a progressively scanned frame of picture, signals having the same information content become arranged adjacent to each other for every two adjacent lines as shown in FIG. 12(B). Accordingly, by combining the displaying the reproduced video signal as a progressively scanned frame of picture and the compression of the frequency band by the dot interleaving, it is possible to improve the horizontal resolution although the vertical resolution becomes slightly deteriorated with respect to the high frequency signal component in the horizontal direction.

However, the slight deterioration in the vertical resolution is extremely small compared to the case where the interpolation of the samples is performed with the scanning lines which are close to each other and are within one field, for example, and no problems are introduced from the practical point of view. With respect to the low frequency signal component in the horizontal direction, it is possible to suppress the flicker in the picture caused by the conventional interlaced scanning, without deteriorating the vertical resolution, when the scanning line is interpolated with the signal of one field before.

Figure 13:
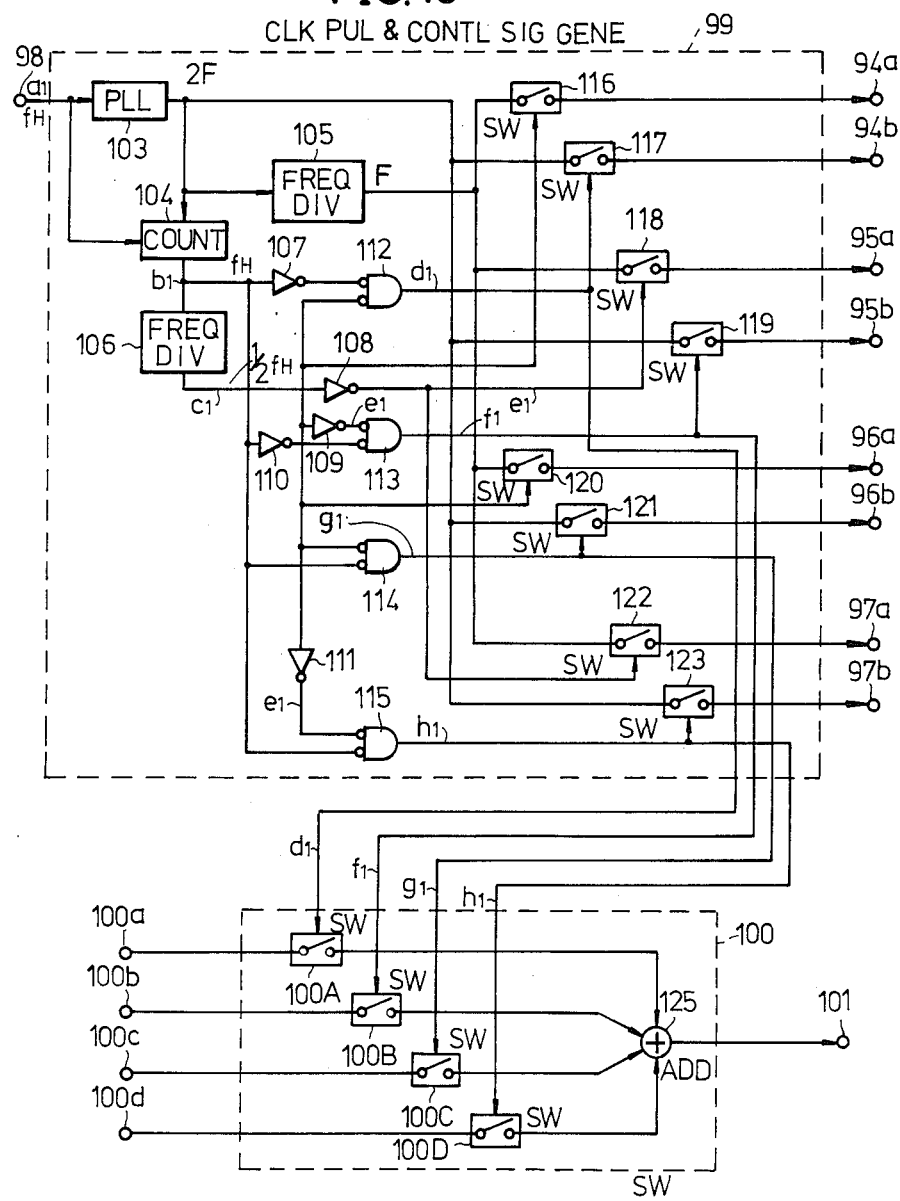
FIG. 13 is a circuit diagram showing an embodiment of a clock pulse and control signal generating circuit and a switching circuit within the block system shown in FIG. 10.

FIG. 13 shows an embodiment of the clock pulse and control signal generating circuit 99 and the switching circuit 100. In FIG. 13, those parts which are the same as those corresponding parts in FIG. 10 are designated by the same reference numerals, and description thereof will be omitted. The generating circuit 99 comprises a PLL circuit 103, a counter 104 which is reset by the reproduced horizontal synchronizing signal from the input terminal 98, ½ frequency dividers 105 and 106, inverters 107 through 111, AND circuits 112 through 115, and switching circuits 116 through 123 which are connected as shown. On the other hand, the switching circuit 100 comprises switch parts 100A through 100D and an adding circuit 125.

Figure 14:
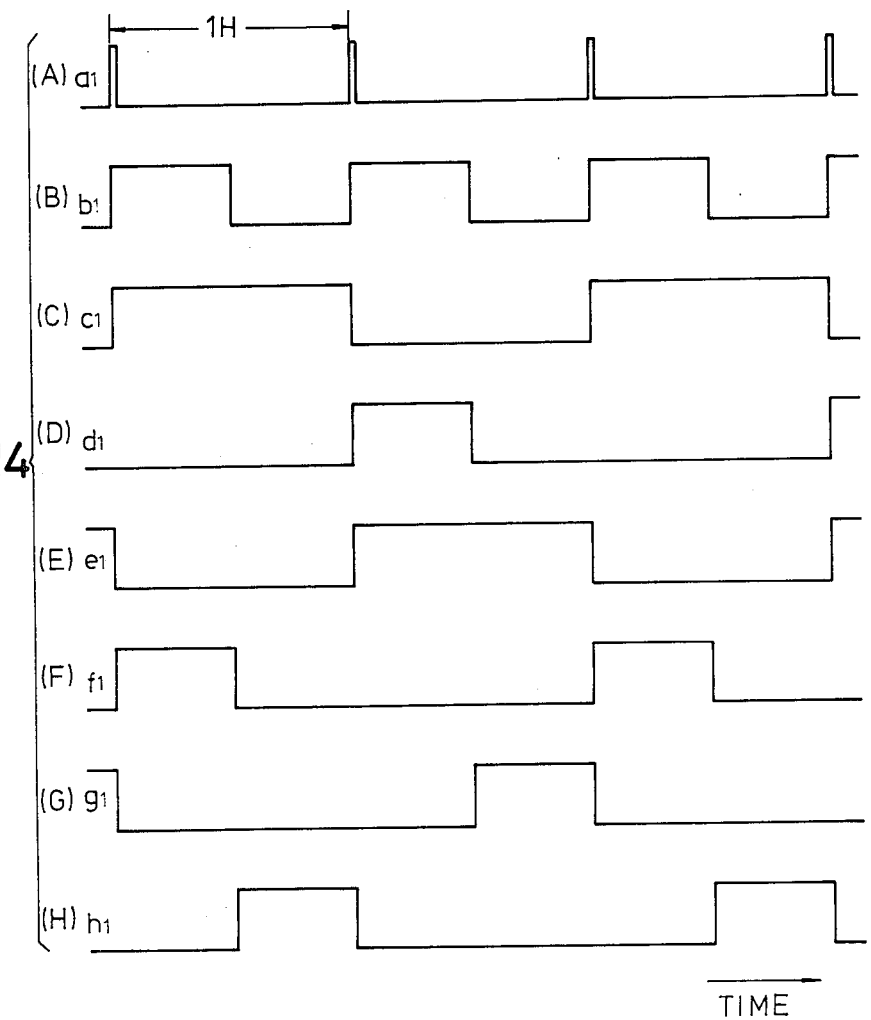
FIGS. 14(A) through 14(H) show signal waveforms for explaining the operation of the circuit shown in FIG. 13.

FIGS. 14(A) through 14(H) show signal waveforms at various parts of the circuit shown in FIG. 13. FIG. 14(A) shows a reproduced horizontal synchronizing signal a1 which is applied to the input terminal 98. FIGS. 14(B) through 14(D) respectively show an output signal b1 of the counter 104, an output signal c1 of the ½ frequency divider 106, and an output signal d1 of the AND circuit 112. FIG. 14(E) shows an inverted signal e1 of the signal c1. FIGS. 14(F) through 14(H) respectively show output signals f1 through h1 of the AND circuits 113 through 115. The signals d1 and f1 through h1 are supplied to the respective switch parts 100A through 100D as a switching control signal.

The write-in clock pulses are obtained from terminals 94a through 97a and are supplied to the respective memories 94 through 97. On the other hand, read-out clock pulses are obtained from terminals 94b through 97b and are supplied to the respective memories 94 through 97.

Returning again to the description of FIG. 1, the reproduced carrier chrominance signal obtained from the reproduced signal processing circuit 28 is supplied to a time base compression circuit 48 wherein the time base is compressed by ½. A time base compressed reproduced carrier chrominance signal from the time base compression circuit 48 is supplied to a decoder 49. The decoder 49 demodulates the compressed reproduced carrier chrominance signal and supplies to output terminals 50 and 51 time base compressed color difference signals R-Y and B-Y as color component signals to be displayed as a progressively scanned frame of picture. The embodiment shown in FIG. 1 does not use the reproduced carrier chrominance signal of one field before, and thus, the time base compression circuit 48 produces the same compressed reproduced carrier chrominance signal two times. As a result, it is sufficient to provide only one reproduced signal processing circuit 28 for the carrier chrominance signal and the circuit construction does not become complex. The decoder 49 is supplied with the compressed reproduced carrier chrominance signal which has been time base compressed by ½ from the time base of the standard television system and in which the chrominance subcarrier frequency is 2 fsc (3.58 MHz×2 the case of the NTSC system) which is two times that of the standard television system. Hence, except for the need to select the reference subcarrier frequency to 2 fsc, it is possible to use as the decoder 49 a decoder similar to a conventionally known decoder for use in the standard television system.

It is of course possible to process the reproduced carrier chrominance signal similarly as in the case of the reproduced luminance signal. That is, a reproduced carrier chrominance signal may be obtained by processing a reproduced signal of approximately one field before from the auxiliary head 23, time base compressing both the reproduced carrier chrominance signal of the present field and the reproduced carrier chrominance signal of the previous field, and alternately producing the two compressed reproduced carrier chrominance signals. It is also possible to perform the time base compression with respect to the two color difference signals which are obtained by the decoding performed in the decoder 49. In this case, input signals of memories which which are used for the time base compression may have a frequency band which is narrow compared to that required in the time base compression circuit 48, and as a result, inexpensive circuit elements may be used because the circuit can be operated with a low frequency.

As a modification of the first embodiment, it is possible to obtain a reproduced video signal which is to be displayed in the interlaced scanning. In this case, instead of providing the time base compression circuits 44 and 45 and the switching circuit 46, an adding circuit (not shown, and substantially the same as the switching circuit 46, for example) is provided to add the first and second reproduced luminance signals from the adding circuits 40 and 41. In this case, it is also unnecessary to provide the time base compression circuit 48.

Next, description will be given with respect to a second embodiment of the video signal reproducing apparatus according to the present invention. In the present embodiment, the circuit part 52, the sampler 14, the switching circuit 15, and the sampling pulse generating circuit 16 shown in FIG. 1 are omitted. Accordingly, the recording system of the apparatus becomes identical to the recording system of the existing VTR, and it is possible to perform the so-called interchanged play in which a magnetic tape recorded on the existing VTR in conformance with a standard recording system is played on the apparatus according to the present invention.

Figure 15:
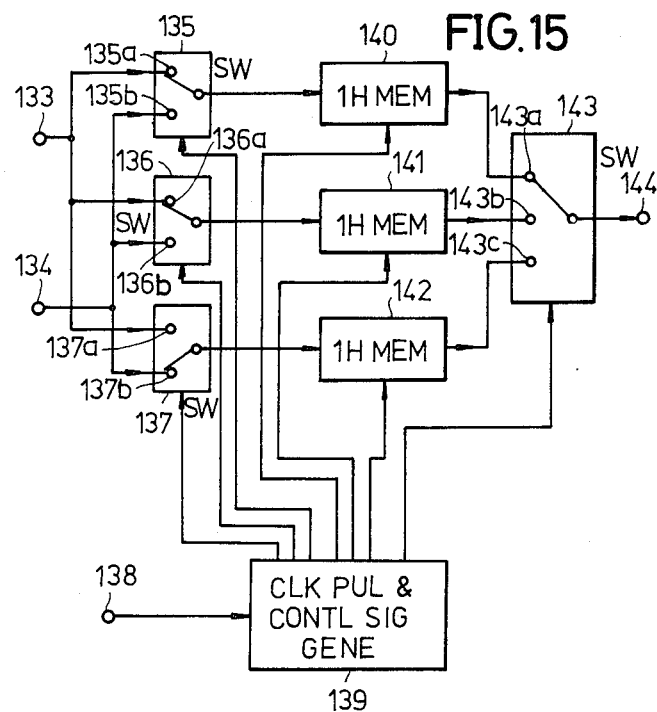
FIG. 15 is a system block diagram showing an embodiment of an essential part of a second embodiment of the video signal reproducing apparatus according to the present invention.

According to the present embodiment, there is no need to perform the re-sampling, and for this reason, the circuit part made up of the time base compression circuits 44 and 45 and the switching circuit 46 may be constructed as shown in FIG. 15. First and second reproduced luminance signals applied to input terminals 133 and 134 are respectively arranged as shown schematically in FIGS. 16(A) and 16(B) with respect to time, and there is a time difference of approximatley one field between the first and second reproduced luminance signals. The first reproduced luminance signal applied to the input terminal 133 is supplied to terminals 135a, 136a, and 137a of respective switching circuits 135, 136, and 137. On the other hand, the second reproduced luminance signal applied to the input terminal 134 is supplied to terminals 135b, 136b, and 137b of the respective switching circuits 135, 136, and 137.

Figure 16:
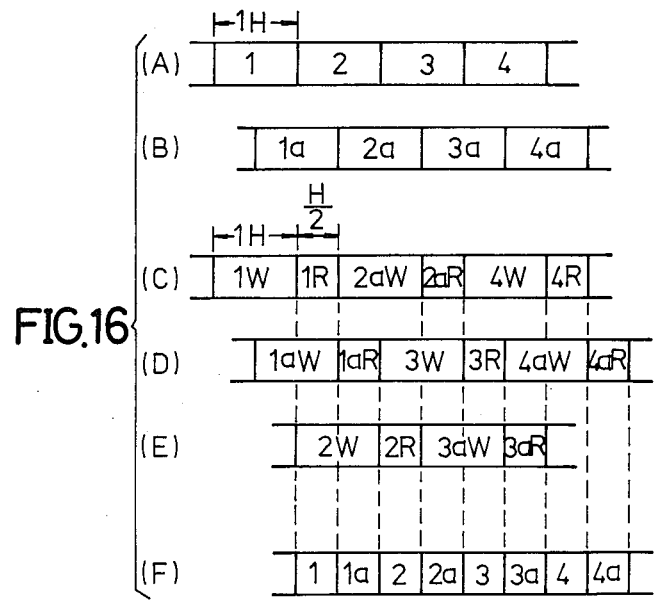
FIGS. 16(A) through 16(F) are diagrams for explaining the operation of the block system shown in FIG. 15.

The switching of the switching circuits 135 through 137 are controlled by a control signal which is generated from a clock pulse and control signal generating circuit 139 which is supplied with the reproduced horizontal synchronizing signal from an input terminal 138. The switching circuits 135 through 137 selectively pass one of the first and second reproduced luminance signals supplied thereto, and the passed reproduced luminance signals are supplied to respective 1 H memories 140 through 142. The memories 140 through 142 respectively perform a write-in operation responsive to a write-in clock pulse which has a frequency F and is generated from the generating circuit 139, and respectively perform a read-out operation responsive to a read-out clock pulse which has a frequency 2F and is generated from the generating circuit 139. As a result, a compressed reproduced luminance signal which has been time base compressed by $\frac{1}{2}$ is obtained from each of the memories 140, 141, and 142. The write-in and read-out operations of the memories 140 through 142 become as shown schematically in FIGS. 16(C) through 16(E). In FIGS. 16(C) through 16(E), "W" represents a write-in operation, "R" represents a read-out operation, and the numbers indicate the signals in each of the horizontal scanning periods shown in FIGS. 16(A) and 16(B).

The compressed reproduced luminance signals read out from the memories 140 through 142 are respectively supplied to terminals 143a through 143c of a switching circuit 143. The switching circuit 143 is successively switched responsive to a control signal which is obtained from the generating circuit 139 so as to selectively supply to an output terminal 144 the output signal of one memory which is performing a read-out operation out of the memories 140 through 142. As a result, the reproduced luminance signal to be displayed as a progressively scanned frame of picture and having the horizontal scanning frequency which is two times that of the standard television system as shown schematically in FIG. 16(F) is obtained through the output terminal 144.

As methods of obtaining the two kinds of reproduced luminance signals having a mutual time difference of approximately one field as shown in FIGS. 16(A) and 16(B), there is a method of setting the distance d between the main head $22_1$ ($22_2$) and the auxiliary head $23_1$ ($23_2$) shown in FIG. 8B to a value equal to a recording wavelength of 1.5 H on the tape 21b, and there is a method of adjusting the time difference between the reproduced signals from the main head $22_1$ ($22_2$) and the auxiliary head $23_1$ ($23_2$) by use of the timing circuit constituted by the circuits 29 through 34 shown in FIG. 1.

In the case where tape 21b has a tape pattern different from that shown in FIG. 6, the distance d between the main head $22_1$ ($22_2$) and the auxiliary head $23_1$ ($23_2$) is set to an appropriate value depending on the tape pattern formed on the tape 21b so that it is possible to obtain reproduced signals having a mutual time difference of approximately one field.

Figure 17:
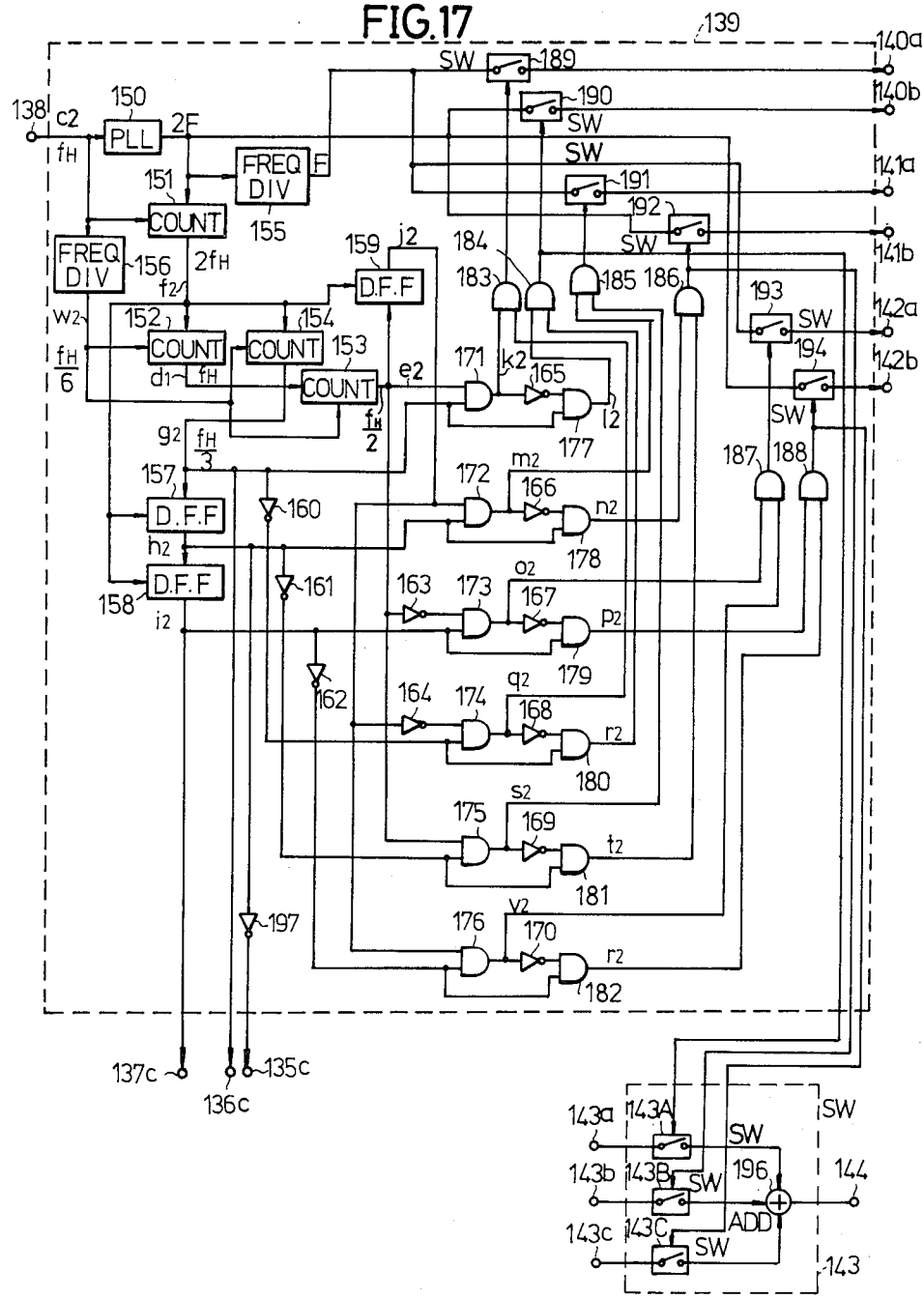
FIG. 17 is a circuit diagram showing an embodiment of a clock pulse and control signal generating circuit and a switching circuit within the block system shown in FIG. 15.

FIG. 17 shows an embodiment of the clock pulse and control signal generating circuit 139 and the switching circuit 143. In FIG. 17, those parts which are the same as those corresponding parts in FIG. 15 are designated by the same reference numerals, and description thereof will be omitted. The generating circuit 139 comprises a PLL circuit 150, counters 151 through 154, a $\frac{1}{2}$ frequency divider 155, a 1/6 frequency divider 156, D-type flip-flops 157 through 159, inverters 160 through 170 and 97, AND circuits 171 through 188, and switching circuits 189 through 194 which are connected as shown. The counter 151 is reset by the reproduced horizontal synchronizing signal from the input terminal 138, and the counters 152 through 154 are respectively reset by an output signal of the 1/6 frequency divider 156. On the other hand, the switching circuit 143 comprises switch parts 143A through 143C and an adding circuit 196. Signals from terminals 135c, 136c, and 137c are respectively supplied to the switching circuits 135, 136, and 137 as switching control signals.

Figure 18:
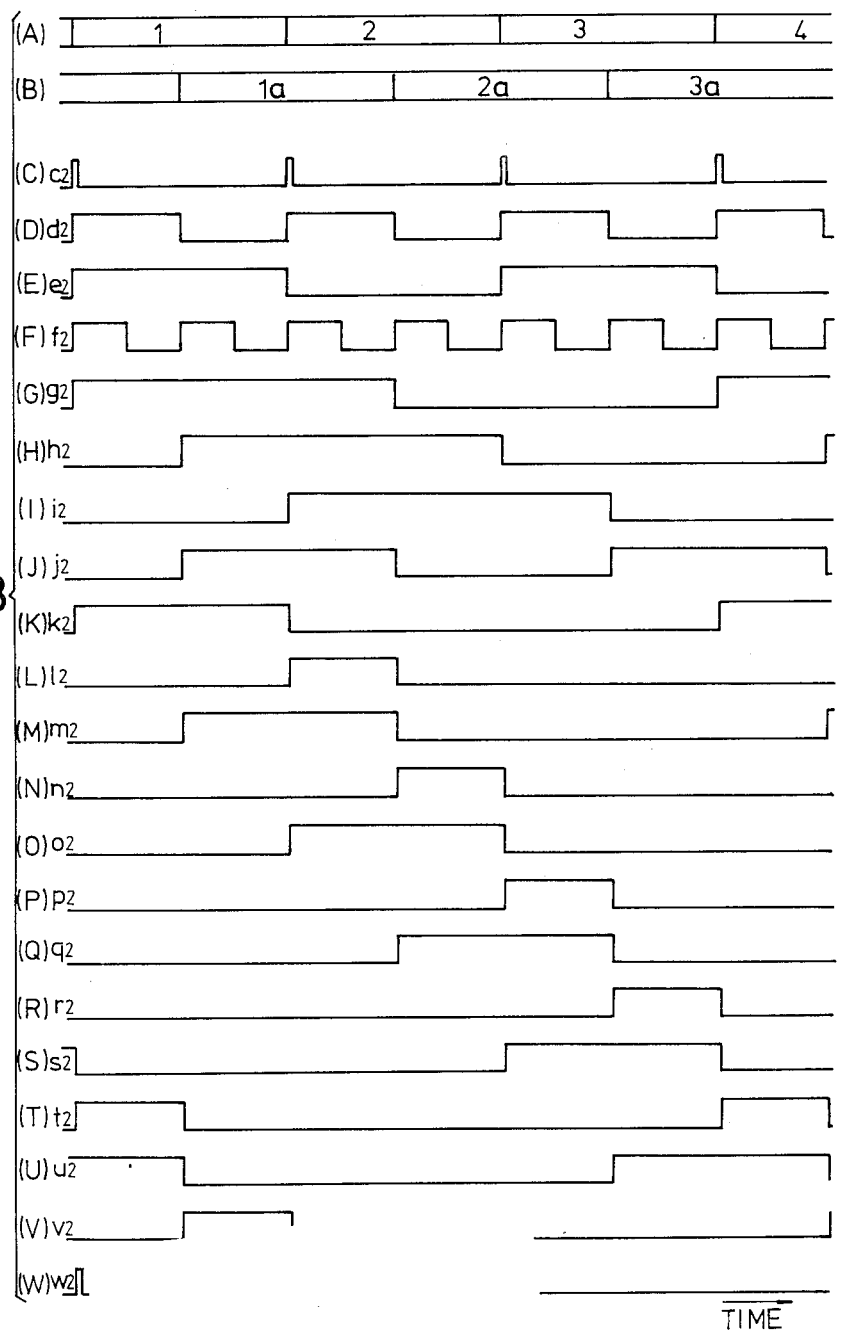
FIGS. 18(A) through 18(W) show signal waveforms for explaining the operation of the circuit shown in FIG. 17.

FIGS. 18(A) and 18(B) are respectively identical to FIGS. 16(A) and 16(B), and FIGS. 18(C) through 18(W) show signal waveforms at various parts of the circuit shown in FIG. 17. FIG. 18(C) shows a reproduced horizontal synchronizing signal c2 applied to the input terminal 138. FIGS. 18(D) through 18(G) respectively show output signals d2, e2, f2, and g2 of the counters 152, 153, 151, and 154. FIGS. 18(H) through 18(J) respectively show output signals h2, i2, and j2 of the flip-flops 157 through 159. FIGS. 18(K), 18(M), 18(O), 18(Q), 18(S), and 18(U) respectively show output signals k2, m2, o2, q2, s2, and u2 of the AND circuits 171 through 176. FIGS. 18(L), 18(N), 18(P), 18(R), 18(T), and 18(V) respectively show output signals l2, n2, p2, r2, t2, and v2 of the AND circuits 177 through 182. FIG. 18(W) shows an output signal w2 of the 1/6 frequency divider 156.

Output signals of the AND circuits 184, 186, and 188 are supplied to the respective switch parts 143A, 143B, and 143C as switching control signals. The write-in clock pulses from terminals 140a through 142a are supplied to the respective memories 140 through 142. On the other hand, the read-out clock pulses from terminals 140b through 142b are supplied to the respective memories 140 through 142.

Further, the present invention is not limited to these embodiments, but various variations and modifications may be made without departing from the scope of the present invention.

What is claimed is:

1. A video signal reproducing apparatus for obtaining a reproduced video signal by reproducing from a recording medium a video signal which is subjected to a predetermined signal processing and is recorded on successive tracks on the recording medium in terms of fields of the video signal, said tracks comprising first tracks recorded with a first signal part and second tracks recorded with a second signal part having a time difference of approximately one field with respect to the first signal part, said video signal reproducing apparatus comprising:
   main head means for scanning first tracks and for reproducing the first signal part;
   auxiliary head means for scanning said second tracks and for reproducing the second signal part, said main head means and said auxiliary head means simultaneously and respectively scanning one of said first tracks and one of said second tracks and simultaneously reproducing the first and second signal parts;
   first signal processing means for subjecting the first signal part reproduced by said main head means to a predetermined signal processing;
   second signal processing means for subjecting the second signal part reproduced by said auxiliary head means to a predetermined signal processing;
   first time base compressing means for time base compressing an output of said first signal processing means;
   second time base compressing means for time base compressing an output of said second signal processing means; and
   switching means supplied with outputs of said first and second time base compressing means for producing said reproduced video signal by alternately passing these outputs responsive to a switching signal.

2. A video signal reproducing apparatus as claimed in claim 1 in which said recording medium is a magnetic tape, said magnetic tape being recorded with a video signal which is subjected to a signal processing in accordance with a standard recording system employed in an existing video signal recording and reproducing apparatus, said switching means producing a reproduced video signal which is to be displayed as progressively scanned frame of picture.

3. A video signal reproducing apparatus as claimed in claim 1 which further comprises timing means supplied with the outputs of said first and second signal processing means for supplying these outputs to the respective first and second time base compressing means after making a phase of a horizontal synchronizing signal within the output of said first signal processing means coincide with a phase of a horizontal synchronizing signal within the output of said second signal processing means.

4. A video signal reproducing apparatus as claimed in claim 1 in which said first and second time base compressing means comprise signal generating means for generating switching signals, a write-in clock pulse, and a read-out clock pulse having a frequency higher than that of the write-in clock pulse, first through third switching circuits respectively supplied with the output of said first signal processing means to a first terminal thereof and supplied with the output of said second signal processing means to a second terminal thereof for selectively passing the output supplied to the first or second terminal depending on the switching signal from said signal generating means, and first through third memories supplied with outputs of the respective first through third switching circuits for performing a write-in operation and a read-out operation depending on the write-in and read-out clock pulses from said signal generating means, said switching means selectively passing a read out signal from one memory which is performing a read-out operation out of said first through third memories depending on a switching signal from said signal generating means.

5. A video signal reproducing apparatus as claimed in claim 4 in which said first through third memories respectively have a memory capacity for storing signals corresponding to one horizontal scanning period of the video signal.

6. A video signal reproducing apparatus as claimed in claim 1 in which said recording medium is recorded with a video signal which is sampled with a pulse which has a repetition frequency fs described by $fs \approx nf_H$ and has a phase which differs by 180° for every one field of an input video signal, where n is a natural number and $f_H$ represents a horizontal scanning frequency of the input video signal, said frequency fs being less than two times an upper limit frequency of the input video signal and being higher than said upper limit frequency, said video signal reproducing apparatus further comprising reproduced video signal producing means supplied with the outputs of said first and second signal processing means for supplying these outputs to the respective first and second time base compressing means after alternately re-sampling these outputs with a pulse having the repetition frequency fs and having a phase which differs by 180° for every one field, said switching means producing a reproduced video signal which is to be displayed as a progressively scanned frame of picture.

7. A video signal reproducing apparatus as claimed in claim 6 in which said reproduced video signal producing means comprises first frequency band dividing means for dividing a frequency band of the output of said first signal processing means so as to obtain a high frequency signal component over a frequency fa described by $fa \approx fs - fb$ and a low frequency signal component under the frequency fa, where fb represents an upper limit frequency of a frequency band required by the input video signal, second frequency band dividing means for dividing a frequency band of the output of said second signal processing means so as to obtain a high frequency signal component over the frequency fa and a low frequency signal component under the frequency fa, re-sampling means for alternately re-sampling the high frequency signal components from said first and second frequency band dividing means with a pulse which has the repetition frequency fs and has a phase which differs by 180° for every one field and for adding re-sampled signals, first adding means for adding the output re-sampled signal of said re-sampling means and the low frequency signal component from said first frequency band dividing means and for supplying an added signal to said first time base compressing means, and second adding means for adding the output re-sampled signal of said re-sampling means and the low frequency signal component from said second frequency band dividing means and for supplying an added signal to said second time base compressing means.

8. A video signal reproducing apparatus as claimed in claim 6 which further comprises timing means supplied with the outputs of said first and second signal processing means for supplying these outputs to the respective first and second time base compressing means after making a phase of a horizontal synchronizing signal within the output of said first signal processing means coincide with a phase of a horizontal synchronizing signal within the output of said second signal processing means.

9. A video signal reproducing apparatus as claimed in claim 6 in which said first and second time base compressing means comprise signal generating means for generating switching signals, a write-in clock pulse, and a read-out clock pulse having a frequency higher than that of the write-in clock pulse, first and second memories respectively supplied with an output of said reproduced video signal producing means for performing a write-in operation and a read-out operation depending on the write-in and read-out clock pulses from said signal generating means, third and fourth memories respectively supplied with another output of said reproduced video signal producing means for performing a write-in operation and a read-out operation depending on the write-in and read-out clock pulses from said signal generating means, said switching means selectively passing a read out signal from one memory which is performing a read-out operation out of said first through fourth memories depending on a switching signal from said signal generating means.

10. A video signal reproducing apparatus as claimed in claim 1 in which a distance between said main head means and said auxiliary head means along a scanning direction thereof corresponds to approximately 1.5 H on the recording medium, where H represents one horizontal scanning period.

11. A video signal reproducing apparatus for obtaining a reproduced video signal by reproducing from a recording medium a video signal which is subjected to a predetermined signal processing and is recorded on successive tracks on the recording medium in terms of fields of the video signal, said recording medium being recorded with a video signal which is sampled with a pulse which has a repetition frequency fs described by $fs \approx nf_H$ and has a phase which differs by 180° for every one field of an input video signal, where n is a natural number and $f_H$ represents a horizontal scanning frequency of the input video signal, said frequency fs being less than two times an upper limit frequency of the input video signal and being higher than said upper limit frequency, said tracks comprising first tracks recorded with a first signal part and second tracks recorded with a second signal part having a time difference of approximately one field with respect to the first signal part, said video signal reproducing apparatus comprising:

main head means for scanning said first tracks and for reproducing the first signal part;

auxiliary head means for scanning said second tracks and for reproducing the second signal part, said main head means and said auxiliary head means simultaneously and respectively scanning one of said first tracks and one of said second tracks and simultaneously reproducing the first and second signal parts;

first signal processing means for subjecting the first signal part reproduced by said main head means to a predetermined signal processing;

reproduced video signal producing means supplied with the outputs of said first and second signal processing means for alternately re-sampling these outputs with a pulse having the repetition frequency fs and having a phase which differs by 180° for every one field; and adding means for adding re-sampled signals from said reproduced video signal producing means to obtain said reproduced video signal which is to be displayed.

* * * * *